United States Patent Office 2,782,177
Patented Feb. 19, 1957

2,782,177

ACETAL COMPOUNDS AS PLASTICIZERS FOR POLYMERS

Wilbur F. Fischer, Cranford, and Jeffrey H. Bartlett, Westfield, N. J., assignors to Esso Research and Engineering Company, a corporation of Delaware No Drawing. Application December 6, 1954, Serial No. 473,452

5 Claims. (Cl. 260—33.2)

This invention relates to a new class of materials which have been discovered to be particularly effective as plasticizers for resins and rubber-like materials. In particular, this invention relates to the use of certain acetal mixtures as plasticizers.

The ever expanding use of plastic materials such as vinyl chloride polymers or copolymers, polyvinyl acetate, cellulose esters, acrylate and methacrylate resins, rubbers such as the emulsion copolymers of butadiene with styrene or acrylonitrile, and the copolymers of isobutylene with small amounts of a diolefin such as isoprene have created a large demand for suitable plasticizers. Alkyl esters and particularly di-2-ethylhexyl phthalate, di-isooctyl phthalate, di-n-octyl phthalate and tri-2-ethylhexyl phosphate have been shown to be acceptable plasticizers for the aforementioned high molecular weight materials, and their use has become widespread throughout the industry. Since each of them, however, possesses definite shortcomings under certain service conditions the industry is continually on the lookout for new and better plasticizers, and extensive research is currently being carried out looking toward this end.

It is one object of the invention to provide the art with a new source of plasticizers. Another object is the production of plastic compositions having superior physical and chemical properties. Still other objects will appear from the subsequent description.

It has now been discovered that certain acetal compounds, which normally would be regarded as being of limited utility because of the recognized instability of acetals as a class, are especially useful as plasticizers for natural rubber, synthetic rubber and vinyl resins.

The properties of a plasticizer which are most important are compatibility, high plasticizing efficiency, as measured by low temperature flexibility of the plasticized material, low volatility, and stability under conditions of use. Usually when changes are made to improve one of these properties, one or more of the other properties will be adversely affected. For example, an increase in molecular weight of the alcohol used in the preparation of a plasticizer tends to reduce volatility at the expense of plasticizing efficiency. However, the acetal plasticizers of this invention show the unexpected combination of a very low volatility coupled with the ability to impart a high degree of flexibility to the plasticized material at low temperatures. The acetals of this invention, furthermore, have been shown to be entirely compatible with rubbery hydrocarbon polymers, and exhibit good stability toward heat during compounding and processing.

The acetals suitable for the present invention are prepared by reacting certain aldehydes with certain alcohols.

The aldehyde and alcohol mixtures required for the present invention are best obtained by the "Oxo" synthesis. The term "Oxo" is understood in the art as referring to a process wherein an olefin feed is first reacted or "oxonated" with carbon monoxide and hydrogen at a temperature between 280° and 400° F. and under a pressure of about 150 to 400 atmospheres in the presence of a cobalt catalyst to form aldehydes in accordance with the following reaction:

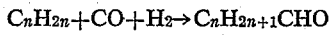

and the aldehydes are then catalytically hydrogenated to form the alcohols as follows:

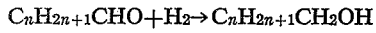

The preferred hydrogenation catalyst is nickel though other known hydrogenation catalysts such as the sulfides of nickel, molybdenum and cobalt, with or without support on carbon, silica, etc., can also be used, especially where a stable and rugged catalyst is desired. The basic principles and operating conditions of the "Oxo" process which can be used for making the aldehydes and alcohols are described, for example, in U. S. Patent 2,327,086 and elsewhere. Aldehydes produced in this manner are usually referred to as oxo aldehydes and similarly the alcohols are known as oxo alcohols.

In discussing the Oxo reaction of olefin hydrocarbons, it has been found convenient to classify the various olefins into five fundamental types according to the character of carbon atoms linked by the olefinic bonds. These five types are as follows:

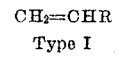

Type I

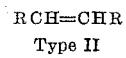

Type II

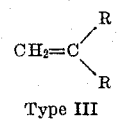

Type III

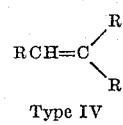

Type IV

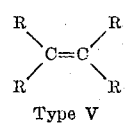

Type V

In the above formulas, R represents a straight or a branched-chain alkyl group, it being understood that where more than one symbol R appears in a formula, the several R symbols may represent the same alkyl group or different alkyl groups. Under this classification, for example, butene-1, 3-ethyl pentene-1, or 4,4-dimethyl pentene-1 are Type I olefins; butene-2, 4,4-dimethyl pentene-2, 2-methyl 5-ethyl hexene-3 are Type II olefins; 2,3,3-trimethyl butene-1 is a Type III olefin; 2,4-dimethyl pentene-2 is a Type IV olefin; tetra-methyl ethylene is a Type V olefin; and so forth.

In the Oxo reactions, generally, there is no invariable point of attack on the olefinic double bond such as one might predict from Markownikoff's rule, and thus in the case of Type I olefins of the formula $H_2C=CHCH_2R$ approximately equal amounts of both 1-substituted alcohols of the formula $CH_2OH.CH_2.CH_2.CH_2R$ and 2-substituted alcohols of the formula $CH_3.CH_2OH.CH_2.CH_2R$ are formed, with the 1-position being slightly favored. It is thus apparent that the Oxo process is inherently committed to the production of at least some branched-chain primary alcohols even when the starting material is a pure Type I straight-chain olefin. Type V olefins are usually incapable of oxonation. The oxonation feed may contain mono-olefins of any type and suitable olefinic feeds may be fractionated, for example, from cracked gases, from Fischer-Tropsch synthesis products or from a polymerized stream of $C_3$ to $C_5$ olefins.

Particularly effective plasticizers can be prepared according to this invention by reacting oxo alcohols having from six to sixteen carbon atoms with $C_8$ oxo aldehydes.

The alcohols and aldehydes formed by oxonation of the olefinic materials described above are naturally quite complex in character and the exact composition of many of these products is not known. They have been found to comprise a mixture of isomers having, on the average, alkyl side groups of one to three carbon atoms attached to a principal paraffinic chain.

For example, the $C_8$ oxo aldehydes useful for reacting with the aforementioned oxo alcohols are formed from $C_7$ olefins and consist essentially of isomers having the formula:

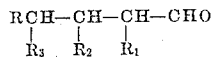

wherein R stands for hydrogen, methyl or ethyl, $R_1$ stands for hydrogen, methyl or isopropyl, $R_2$ and $R_3$ stand for hydrogen, methyl, ethyl and isopropyl, and wherein R plus $R_1$, plus $R_2$ plus $R_3$ contain a total of 4 carbon atoms. The oxo alcohols are prepared in a similar manner from the corresponding olefin fraction, e. g. $C_6$ alcohols from $C_5$ olefins, $C_7$ alcohols from $C_6$ olefins, etc.

The $C_8$ aldehydes and the $C_6$ to $C_{16}$ alcohols are reacted together in a suitable reactor fitted with a distillation column and condenser, using a ratio of 1 mole aldehyde to 2 moles plus 10% excess of alcohol in the presence of about 0.1% based on the total reactants of an acid such as toluene sulfonic acid, HCl and the like and about 20%, based on the alcohol, of a water-entraining agent, such as toluene. The progress of the reaction is determined by measuring the amount of water evolved and carried overhead to the condenser. Conversions of 95–100% to the acetal is reached in about 4 to 4.5 hours. Temperatures during reaction range from 117–221° C. in the pot and 94–154° C. overhead for the preparation of the $C_{40}$ acetal and 139–153° C. pot and 123–134° C. overhead for the $C_{20}$ acetal. After the reaction has been concluded solid anhydrous sodium carbonate is added to the pot, the excess alcohol and entrainer are distilled off, and finally the high boiling acetal is taken overhead under vacuum. The $C_{20}$ acetal may be prepared by reacting the $C_8$ aldehyde with the $C_6$ alcohol; similarly the $C_{24}$ and $C_{40}$ acetals may be made by reacting the $C_8$ aldehyde with the $C_8$ and $C_{16}$ alcohols respectively. The reaction thus proceeds in accordance with the following typical reaction:

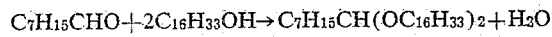

The advantages of the invention will be better understood from a consideration of the following experimental data which are given for the sake of illustration, but without intention of limiting the invention thereto.

EXAMPLE I $C_{20}$, $C_{24}$ and $C_{40}$ acetals were prepared in accordance with the description given above.

Analytical results presented in Table I serve to characterize the acetals. It will be observed that these all-oxo products exhibit very excellent low temperature properties. Viscosities at −40 and −65° F. and the pour point of the $C_{24}$ acetal are essentially equivalent to di-2-ethyl hexyl sebacate which is one of the best known plasticizers currently available for most rubbers and vinyl resins. Relative to the other materials evaluated in Table I, the acetals are shown to be superior at reduced temperatures. This is important with respect to their ultimate value as plasticizers since the low temperature properties of the plasticized rubber vulcanizate generally parallel the behavior of the plasticizer itself under similar low temperature treatment.

*Table I*
PHYSICAL PROPERTIES OF ACETALS

| | Diisooctyl Phthalate | Di-2-Ethyl Hexyl Sebacate | $C_{20}$ Acetal | $C_{24}$ Acetal | $C_{40}$ Acetal |
|---|---|---|---|---|---|
| Specific Gravity, at 20/20° C | | 0.9839 | 0.8458 | | 0.8443 |
| Boiling Range, °C., @ mm. Hg | 230–238 4.0 mm. | 180–184 0.13 mm. | 160–177 15.0 mm. | 140–160 0.25 mm. | 180–220 3.0 mm. |
| Kin. Viscosity, Cs. @— | | | | | |
| 210° F | 4.2 | 3.28 | 1.6 | 2.29 | 4.03 |
| 100° F | 27.2 | 12.42 | 5.2 | 8.77 | 26.8 |
| −40° F | 56,300 | 1,383 | 481 | 1,502 | 27,074 |
| −65° F | | 7,724 | | 10,785 | |
| Pour Point, °F | −50 | <−75 | <−75 | <−75 | −70 |
| Flash Point, °F | 435 | 465 | | 330 | 335 |

EXAMPLE II

The effectiveness of the novel esters of this invention as plasticizers is shown in the runs evaluated in Table II wherein a commercial butyl rubber was chosen as the illustrative material. In preparing the test samples 5 grams of basic zinc oxide, 0.5 gram of stearic acid, 50 parts of carbon black, 2 parts of sulfur, 1 part of tetramethyl thiuram disulfide, 1 part of tellurium diethyl dithiocarbamate, and 15 grams of plasticizer were incorporated into 100 grams of butyl rubber (GR–I–15) on a 6″ x 12″ laboratory mill. The rubber mixture was then allowed to mill with a rolling bank for five minutes with frequent cutting to effect good dispersion of the additives. After mill mixing, the stock was sheeted off at 0.075 to 0.15 inch thickness.

The sheeted stock was then vulcanized for 45′ at 307° F. in a standard A. S. T. M. mold (D16–41) yielding slabs 6 x 6 x 0.075 inch. The vulcanizates were allowed to stand near 75° F. for at least one day before testing.

Tensile elongation and modulus at 300% extension were determined in the usual manner according to the procedure outlined in A. S. T. M. procedure D412–49T. The specimen pads to be tested were cut from the vulcanized slabs with die C (A. S. T. M. D412–49T).

In case of limited miscibility, there is a tendency for the plasticizer to exude or permeate through the rubber network and come to the surface of the test piece. To check this phenomenon, the cured pads were first wiped clean with acetone and sandwiched between sheets of cigarette paper under a one p. s. i. load. After seven days the pads were inspected carefully and qualitative observations were made concerning the tendency for bleeding.

The elastic constant (K) in dynes per sq. cm., the coefficient of internal viscosity (N), in poises, the relative damping, an expression involving the ratio of $K/N_1$, and NF, an expression of the relation of elastic losses to frequency, were obtained at 50° C. for all of the vulcanizates. The test procedure utilizes a dynamic free vibration system with the Yerzley oscillograph (A. S. T. M. Procedure D945–49T). Low values for viscosity (N), relative damping $K/N$, and NF are desirable. High values for the elastic modulus K are desirable although incorporation of most plasticizers will decrease both the K and N values. Consequently, composite terms are necessary to describe the elasticity of these systems.

Physical properties of the butyl rubber-acetal compositions are presented in Table II. Results in general indicate that the acetals impart a level of dynamic properties to butyl rubber that equals the performance level obtained when using the best ester and hydrocarbon type plasticizers available. This important point is exemplified by the desirably low viscosity (N) values and decreased viscosity-frequency (NF) and relative damping terms as compared to the nonplasticized control. As will be noted both of the rubber-acetal compositions show very good dynamic properties.

Table II
PHYSICAL PROPERTIES OF BUTYL RUBBER VULCANIZATES PLASTICIZED WITH ACETALS

| Test Temperature | 25° C. | | | | 50° C. | | | |
|---|---|---|---|---|---|---|---|---|
| | Bleeding | Tensile Strength, p. s. i. | Elong. | Modulus @ 300% p. s. i. | K×10⁷ Dyne/cm. | N×10⁵, Poises | Relative Damping, percent | NF×10⁵ |
| Plasticizer: | | | | | | | | |
| Control (No Plasticizer) | | 1,580 | 355 | 1,350 | 5.1 | 4.2 | 24.0 | 17.3 |
| Di-2-Ethyl Hexyl Phthalate | None | 1,490 | 465 | 850 | 4.6 | 2.1 | 14.2 | 8.8 |
| Di-2-Ethyl Hexyl Sebacate | None | 1,400 | 435 | 900 | 4.7 | 1.9 | 14.4 | 8.1 |
| C₂₄ Acetal | None | 1,410 | 470 | 825 | 4.5 | 2.2 | 15.1 | 9.1 |
| C₄₀ Acetal | None | 1,585 | 520 | 710 | 4.1 | 2.3 | 17.3 | 9.7 |
| Forum 40 (Hydrocarbon Oil) | None | 1,425 | 415 | 915 | 4.8 | 2.3 | 14.9 | 9.6 |

Time: Test pieces molded—45' @ 307° F.
Formulation, parts by weight: GR-I-15, 100; Philblack A, 15 ¹; Gastex, 35 ¹; stearic acid, 0.5; zinc oxide, 5; sulfur, 2; Tuads, 1 ²; Tellurac, 1 ³; plasticizer, 15.
¹ Carbon black.
² Tetramethyl thiuram disulfide.
³ Tellurium diethyl dithiocarbamate.

In summary, this invention relates to novel branched chain acetals wherein the aliphatic alcohols used in the acetalization reaction contain from 6 to 16 carbon atoms per molecule and the aldehydes have 8 carbon atoms, where each is a mixture of isomers derived by oxonation of the appropriate olefin. In particular, the invention relates to plasticized rubber compositions containing the above-described novel acetals as plasticizers, usually in proportions ranging from about 5 to 100 parts or preferably 15 to 60 parts per 100 parts of rubber. Polymeric materials which lend themselves to successful plasticization with the acetals of this invention include the various rubber-like polymers of diolefinic materials such as butadiene-nitrile (GR-A), butadiene-styrene (GR-S) or polychloroprene elastomers, or isobutylene-diolefin copolymers of the GR-I type, or other polymeric materials customarily requiring plasticization. The acetals generally are not entirely compatible with the vinyl-type resins without modification. However, by introducing halogen, sulfur or oxygen groups into the hydrocarbon chain of the acetal, these materials may be rendered readily compatible with the vinyl resins. Mixtures of different types of polymeric materials also may be used, such as a mixture of 100 parts by weight of vinyl chloride resin with 10 to 300 parts by weight of butadiene-acrylonitrile synthetic rubber of 15 to 40% nitrile. It will be understood, of course, that in addition to the plasticizer, the polymer compositions may also contain conventional stabilizers such as phenyl beta naphthylamine or other anti-oxidant types, activators such as zinc oxide or stearic acid, auxiliary plasticizers or softeners, fillers, pigments and eventually also curing agents, when the polymer is of the curable type.

The nature of the present invention having been thus fully set forth and specific examples of the same given, what is claimed as new and useful and desired to be secured by Letters Patent is:

1. A composition of matter comprising a polymeric material selected from the group consisting of natural rubber and synthetic rubber-like polymers and copolymers of diolefinic materials and a plasticizing amount of a mixture of isomeric acetals prepared by reacting a mixture of $C_8$ aldehydes obtained by the catalytic oxonation of a mixture of $C_7$ olefins at a temperature between 250 and 400° F. and pressures between 150 and 400 atmospheres consisting essentially of isomers having the formula

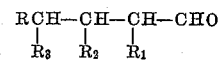

where R is selected from the group consisting of hydrogen, methyl, and ethyl, $R_1$, $R_2$ and $R_3$ are selected from the group consisting of hydrogen, methyl, ethyl and isopropyl and wherein R plus $R_1$ plus $R_2$ plus $R_3$ contain a total of 4 carbon atoms, with an alcohol having 6–16 carbon atoms, said alcohol being obtained by hydrogenating the product obtained by the catalytic oxonation of a mixture of olefins having 5–15 carbon atoms at a temperature between 250 and 400° F. and pressures between 150 and 400 atmospheres.

2. A composition of matter comprising 100 parts of rubber-like isobutylene-diolefin copolymer, 30 to 60 parts of an acetal of a $C_8$ aldehyde obtained by the catalytic oxonation of a mixture of $C_7$ olefins at a temperature between 250° and 400° F. and pressures between 150 and 400 atmospheres and an alcohol having 6–16 carbon atoms, said alcohol being prepared by hydrogenating the product obtained by the catalytic oxonation of a mixture of olefins having 5–15 carbon atoms at a temperature between 250 and 450° F. and pressures between 150 and 400 atmospheres.

3. A composition according to claim 2 in which the alcohol is a $C_6$ alcohol.

4. A composition according to claim 2 in which the alcohol is a $C_8$ alcohol.

5. A composition according to claim 2 in which the alcohol is a $C_{16}$ alcohol.

References Cited in the file of this patent

UNITED STATES PATENTS 2,468,309  Sibley _____ Apr. 26, 1949